(12) United States Patent
Lomakin et al.

(10) Patent No.: US 8,228,636 B2
(45) Date of Patent: Jul. 24, 2012

(54) APPARATUS, SYSTEM AND METHOD FOR MAGNETIC RECORDING

(75) Inventors: Vitaliy Lomakin, San Diego, CA (US); Boris Livshitz, San Diego, CA (US); Richard Choi, Glendale, CA (US); Shaojing Li, La Jolla, CA (US); Akihiro Inomata, Kanagawa (JP)

(73) Assignee: The Regents of the University of California, Oakland, CA (US)

( * ) Notice: Subject to any disclaimer, the term of this patent is extended or adjusted under 35 U.S.C. 154(b) by 83 days.

(21) Appl. No.: 12/261,824

(22) Filed: Oct. 30, 2008

(65) Prior Publication Data

US 2010/0110579 A1   May 6, 2010

(51) Int. Cl.
*G11B 5/667* (2006.01)
*G11B 5/82* (2006.01)
(52) U.S. Cl. .................. 360/135; 428/827; 428/829
(58) Field of Classification Search .............. 360/135; 428/827, 828.1, 829
See application file for complete search history.

(56) References Cited

U.S. PATENT DOCUMENTS

| | | | |
|---|---|---|---|
| 6,391,430 | B1 | 5/2002 | Fullerton et al. |
| 6,881,495 | B2 * | 4/2005 | Kikitsu et al. ............. 428/827 |
| 6,906,879 | B1 | 6/2005 | Albrecht et al. |
| 6,947,235 | B2 | 9/2005 | Albrecht et al. |
| 7,070,870 | B2 | 7/2006 | Bertero et al. |
| 7,128,987 | B2 | 10/2006 | van de Veerdonk et al. |
| 7,141,317 | B2 * | 11/2006 | Kikitsu et al. ............. 428/829 |
| 7,271,984 | B2 | 9/2007 | Umeda et al. |
| 2005/0041335 | A1 * | 2/2005 | Kikitsu et al. ............. 360/110 |
| 2006/0177702 | A1 * | 8/2006 | Ajan ...................... 428/828.1 |
| 2006/0222902 | A1 * | 10/2006 | Mukai ...................... 428/827 |
| 2007/0217075 | A1 * | 9/2007 | Kamata et al. ............ 360/135 |
| 2008/0137231 | A1 * | 6/2008 | Lim et al. ................. 360/131 |
| 2008/0144213 | A1 * | 6/2008 | Berger et al. ............. 360/110 |

FOREIGN PATENT DOCUMENTS

| | | | |
|---|---|---|---|
| JP | 2004355729 A | * | 12/2004 |
| JP | 2006196708 A | * | 7/2006 |
| JP | 2006286105 A | * | 10/2006 |

OTHER PUBLICATIONS

English-machine translation to Shibata et al. (JP 2006-196708 A), published on Jul. 27, 2006.*
Albrecht, M., et al., "Recording Performance of High-Density Patterned Perpendicular Magnetic Media," Applied Physics Letters, 81(15):2875-2877, Oct. 2002.
Bertram, H.N., et al., "Energy Barriers in Composite Media Grains," IEEE Transactions on Magnetics, 43(6):2145-2147, Jun. 2007.

(Continued)

*Primary Examiner* — Will J Klimowicz
(74) *Attorney, Agent, or Firm* — Perkins Coie LLP

(57) ABSTRACT

An apparatus, system and method for magnetic recording are disclosed. In at least one embodiment, the apparatus includes a first portion of a first magnetic medium having a first cross-sectional area, and a second portion of a second magnetic medium having a second cross-sectional area. The first and second portions are joined by way of a junction that allows for at least some ferromagnetic coupling therebetween. Additionally, the first and second cross-sectional areas are of differing extent in a first dimension so that a first ledge portion of one of the first and second portions extends past a first edge of the other of the first and second portions.

17 Claims, 6 Drawing Sheets

OTHER PUBLICATIONS

Dobin, A., et al., "Domain Wall Assisted Magnetic Recording," Applied Physics Letters, 89(6):062512(1-3), Aug. 2006.

Freeman, M.R., et al., "Picosecond Pulsed Magnetic Fields for Studies of Ultrafast Magnetic Phenomena," IEEE Transactions on Magnetics, 27(6):4840-4842, Nov. 1991.

Gao, K.-Z., et al., "Energy Surface Model and Magnetization Switching for Exchange Coupled Magnetic Particles," Journal of Applied Physics, 99(8):08K503(1-3), Apr. 2006.

He, L., et al., "High Speed Coherent Switching Below the Stoner-Wohlfarth Limit," IEEE Transactions on Magnetics, 30(6):4086-4088, Nov. 1994.

Livshitz, B., et al., "Fast Precessional Reversal in Perpendicular Composite Patterned Media," Journal of Applied Physics, 103(7):07C516(1-3), Apr. 2008.

Livshitz, B., et al., "Precessional Reversal in Exchange-Coupled Composite Magnetic Elements," Applied Physics Letters, 91(18):182502(1-3), Oct. 2007.

Lomakin, V., et al., "Patterned media for 10 Tbit/in2 utilizing dual-section 'ledge' elements," IEEE Transactions on Magnetics, 44(11):3454-3459, Nov. 2008.

Richter, H.J., et al., "Analysis of Magnetization Processes in Composite Media Grains," Journal of Applied Physics, 99(8):08Q905(1-3), Apr. 2006.

Richter, H.J., et al., "Recording on Bit-Patterned Media at Densities of 1 Tb/in2 and Beyond," IEEE Transactions on Magnetics, 42(10):2255-2260, Oct. 2006.

Richter, H.J., et al., "Recording Potential of Bit-Patterned Media," Applied Physics Letters, 88(22):222512(1-3), May 2006.

Stoner, E.C., et al., "A Mechanism of Magnetic Hysteresis in Heterogeneous Alloys," Philosophical Transactions of the Royal Society of London A, A240(826):599-642, May 1948.

Suess, D., et al., "Exchange Spring Media for Perpendicular Recording," Applied Physics Letters, 87(1):012504(1-3), Jul. 2005.

Terris, B.D., et al. "Patterned Media for Future Magnetic Data Storage," Microsystem Technologies, 13(2):189-196, Nov. 2006.

Victora, R., et al., "Composite Media for Perpendicular Magnetic Recording," IEEE Transactions on Magnetics, 41(2):537-542, Feb. 2005.

* cited by examiner

APPARATUS, SYSTEM AND METHOD FOR MAGNETIC RECORDING

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to recording systems and, more particularly, to magnetic recording systems that allow for data storage and/or retrieval.

BACKGROUND OF THE INVENTION

The superparamagnetic effect, which occurs when magnetic grains become too tiny, is a major limitation in constructing magnetic devices, such as recording media for high density hard disk drives or Magnetic Random Access Memory (MRAM) system. One promising solution is to use patterned magnetic media, where magnetic layers comprise arrays of separated magnetic elements.

While promising, several hurdles remain in successfully implementing patterned magnetic media. First, the implementation of conventional patterned magnetic media still involves the use of undesirably-high levels of switching fields as produced by magnetic write heads due to the need to use materials with high anisotropy required for sufficient thermal stability. Particularly with respect to magnetic elements that are homogeneous, such high anisotropy translates into high reversal fields, which are hard to switch in realistic recording systems. Second, the implementation of such patterned magnetic media typically suffers from excessive amounts of adjacent element overwriting, in which the magnetic fields generated by a write head not only affect a given magnetic element but also affect one or more neighboring magnetic elements in an undesired manner.

Recently, composite media have been investigated for use as the magnetic elements in patterned media. Such composite media are formed by positioning two or more layers of different magnetic elements upon one another in a stacked manner so as to form an overall composite magnetic element. In particular, such composite media typically employ one or more magnetically soft element(s) in an alternating, stacked (layered) arrangement with one or more magnetically hard element(s). By using such alternating layers of hard and soft element(s), the overall composite magnetic elements can be influenced (in terms of their magnetization) by reversal fields that are of a significantly lower magnitude than those used with homogenous magnetic elements, while at the same time can achieve the same thermal stability and the same reliable recording levels achieved through the use of magnetic elements that are strictly hard in terms of their material properties.

Although the reversal fields that can be used to write to patterned media using composite magnetic elements are lower than those used to write to patterned media using homogenous elements, the reversal fields nevertheless still may be undesirably high. Moreover, a substantial reduction of the reversal field is achieved only for elements of a significant height, which may further increase the requirements for the head fields. In addition, as mentioned above, a significant concern in designing and implementing magnetic media is that adjacent element overwriting be avoided and that the magnetic media be capable of achieving improved writing margins. Although closely-packed magnetic elements in patterned media are desirable for increasing recording capacity, when high reversal fields are used to write to a given composite magnetic element, there is still a significant chance that neighboring magnetic elements will be affected (or reversed) by stray magnetic fields generated by the writing device.

It would therefore be advantageous if an improved form of magnetic media could be developed that was capable of operating with even lower levels of reversal fields than those employed with conventional patterned media employing composite magnetic elements, so as to allow for both high recording capacity and at the same time minimize adjacent element overwriting.

SUMMARY OF THE INVENTION

The present inventors have recognized the benefits associated with conventional patterned media employing composite magnetic elements, as well as recognized the desirability of a further-improved magnetic media that met the above-described goals involving lower levels of reversal fields, high recording capacity and minimization of adjacent element overwriting. The present inventors further have recognized that conventional patterned media employ composite magnetic elements that are formed from multiple layers of magnetic elements that are all coextensive in terms of their cross-sectional area, recognized that it is not necessary that the various layers of composite magnetic elements be coextensive in cross-sectional area, and discovered that composite magnetic elements employing multiple layers of magnetic elements in which the elements of different layers are of differing cross-sectional areas can achieve operation with significantly lower field reversal levels that those used with conventional patterned media while at the same time achieving similarly high recording capacity and reduced adjacent element overwriting as that experienced using conventional patterned media.

In at least one embodiment, the present invention relates to an apparatus for magnetic recording. The apparatus includes a first portion of a first magnetic medium having a first cross-sectional area, and a second portion of a second magnetic medium having a second cross-sectional area. The first and second portions are joined by way of a junction that allows for at least some ferromagnetic coupling therebetween. Further, the first and second cross-sectional areas are of differing extent in a first dimension (e.g., a horizontal dimension, perpendicular to the stacking direction) so that a first ledge portion of one of the first and second portions extends past a first edge of the other of the first and second portions.

Further, the present invention in at least one embodiment relates to a system for magnetic recording. The system includes a recording head capable of generating magnetic fields, and a patterned magnetic media including a plurality of magnetic composite elements. Each of the magnetic composite elements respectively includes a first portion of a first magnetic medium having a first cross-sectional area, and a second portion of a second magnetic medium having a second cross-sectional area. The first and second portions of each respective magnetic composite element are joined by way of a junction that allows for at least some ferromagnetic coupling therebetween. Also, the first and second cross-sectional areas of each respective magnetic composite element are of differing extent in a first dimension so that a first ledge portion of one of those first and second portions extends past a first edge of the other of those first and second portions.

Additionally, in at least one embodiment, the present invention relates to a method of magnetic recording. The method includes providing a patterned magnetic media including a plurality of magnetic composite elements, and controlling movement of a recording head across the patterned magnetic media and simultaneously controlling a magnetic field generated by the recording head so as to influence collective magnetization levels experienced by the magnetic composite elements, whereby information is stored on the patterned magnetic media. Each of the magnetic composite elements respectively includes a first portion of a first magnetic medium having a first cross-sectional area, and a second portion of a second magnetic medium having a second cross-sectional area. The first and second portions of each respective magnetic composite element are joined by way of a respective junction that allows for at least some ferromagnetic coupling therebetween. Also, the first and second cross-sectional areas of each respective magnetic composite element are of differing extent in a respective first dimension so that a first ledge portion of one of those first and second portions extends past a first edge of the other of those first and second portions

DETAILED DESCRIPTION OF THE PREFERRED EMBODIMENT

Figure 1:
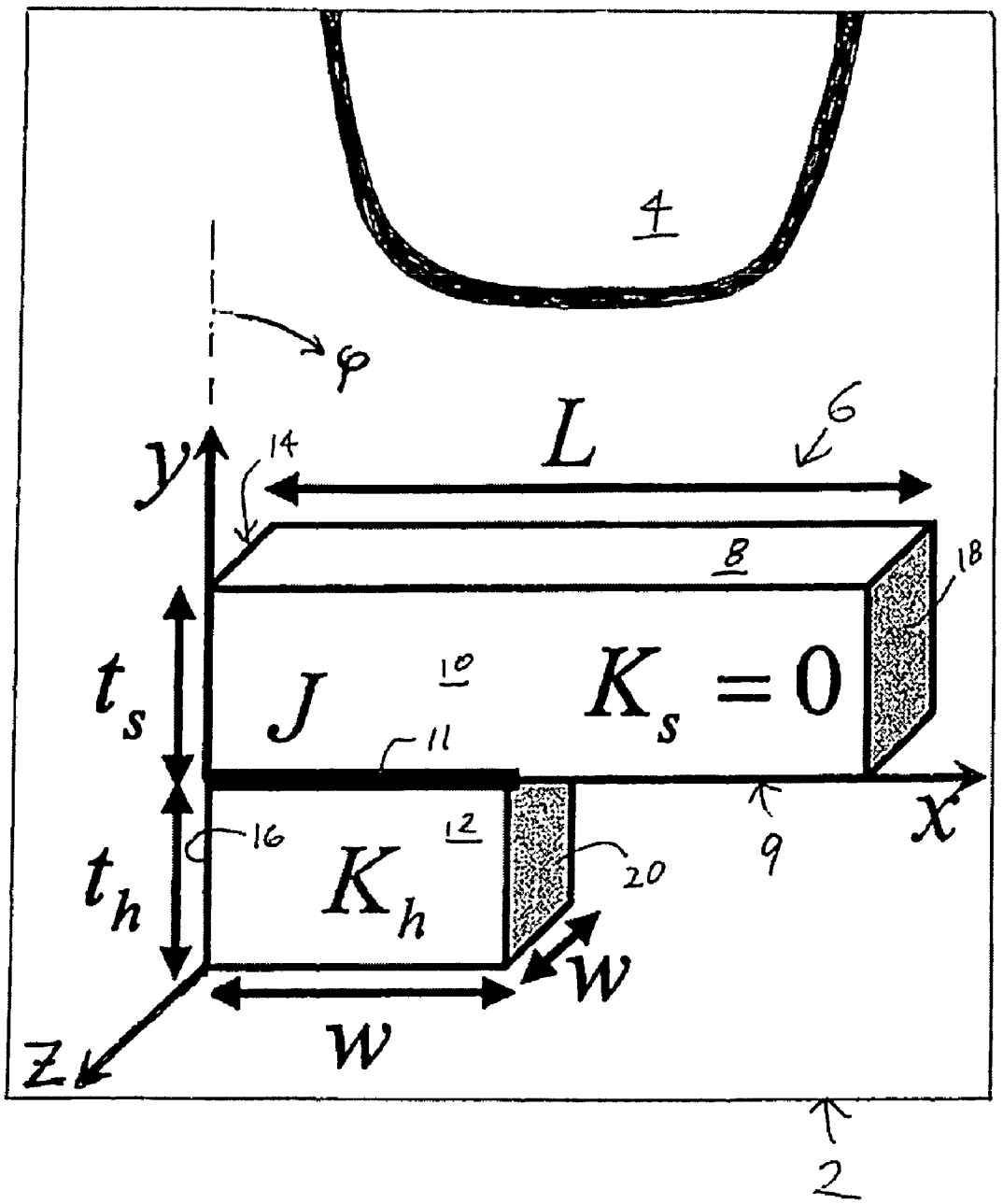
FIG. 1 shows an exemplary recording device having, among other components, a read/write head and, in accordance with at least one embodiment of the present invention, an exemplary composite magnetic element (shown in perspective view) having layers of differing cross-sectional areas.

Referring to FIG. 1, an exemplary magnetic recording device 2 is shown in schematic form to include a recording head 4 and a portion of patterned magnetic media of the magnetic recording device on which data can be stored. In FIG. 1, the portion of the patterned magnetic media in particular is a composite magnetic element 6, although it will be understood from the further discussion below that the patterned magnetic media includes numerous such composite magnetic elements arranged in an array (it should be understood that, notwithstanding the symbolic representation of the recording head 4 in FIG. 1, the head typically in practice can be significantly larger than any given magnetic element).

The recording head 4 in particular is positioned above (and is separated by a space from) the composite magnetic element 6, and is capable of moving in relation to a top surface 8 of the composite magnetic element. Typically such movement occurs within a plane parallel to the top surface 8 (e.g., movement from beyond the left side of the composite magnetic element to the left side and then to and beyond the right side of that element). In the discussion below, it is presumed that the recording head 4 in particular is a write head that is capable of generating magnetic field(s) that influence magnetization of the composite magnetic element 6 so as to store information/data on that element. However, it should also be understood that typically a magnetic recording device such as the device 2 will also include a read head in addition to a write head, where the read head allows for sensing of the magnetization of the composite magnetic element and thereby allows for reading of information/data stored on such an element. The recording head 4 is also intended to be generally representative of such a read head as well.

The recording head 4 as a write head is capable of generating magnetic fields having a variety of characteristics and/or satisfying a variety of criteria including, for example, fields varying with time such as, further for example, fields having rising fronts, pulses, continuously oscillating forms, microwave frequency fields, and combinations of these, among other types of fields. The recording head 4 by virtue of generating such fields is capable of switching the magnetization in that composite magnetic element, thus recording information. (Alternatively, where the recording head 4 is instead a read head, it senses the magnetic field produced by the magnetic element 6 and thus senses any data represented by that magnetic field.) Although only the single recording head 4 is shown, from the above discussion it will be understood that in various embodiments both a write head and a read head are employed and, in some such embodiments, it is even possible that more than one write head serving the purpose of writing information and more than one read head serving the purpose of reading information will be present.

The recording device 2 is intended to be representative of any of a wide variety of different types of devices that store and recall information by way of the use of magnetic fields being applied to, and sensed from, magnetic storage media. For example, the recording device 2 can be a high density hard disk drive or a Magnetic Random Access Memory (MRAM) system. It will be understood that, although such components are not shown in FIG. 1, depending upon the type of recording device a variety of additional mechanical and electrical (including computerized) components can be provided as part of the recording device. For example, the recording device can have a microprocessor-based control device (or other control device) and an electrical motor that governs movement of the read/write head 4 based upon signals received from the control device.

The composite magnetic element 6 of FIG. 1 is one example of a variety of different types of composite magnetic elements and arrangements of such composite magnetic elements (e.g., in the form of patterned magnetic media) encompassed by the present invention. As will be described in further detail below, embodiments of the present invention are intended to encompass a variety of different types of composite magnetic elements having multiple layers of magnetic elements that are of differing cross-sectional area. In particular with respect to the composite magnetic element 6 of FIG. 1, it can be seen that this element includes two different magnetic element sections, namely, a top section 10 and a bottom section 12, which are of unequal extent. As shown, the sections 10, 12 are stacked in the vertical dimension (e.g., along a y axis as shown) and they have the horizontal center lines that are shifted relative to one another.

More particularly as shown, the bottom section 12 of the composite magnetic element 6 has a size of w, $t_h$, w in the x, y, z dimensions, respectively, and it is magnetically hard with a vertical uniaxial anisotropy of energy $K_h$. The top section 10 has a size of L, $t_s$, w in the x, y, z dimensions, respectively, and it is magnetically soft with vanishing anisotropy ($K_s$=0). Further as shown, left faces 14 and 16 of the top and bottom sections 10 and 12, respectively, are aligned. In contrast, the top section 10 extends beyond the bottom section 12 by a distance L−w such that a right face 18 of the top section is located by that distance to the right of a right face 20 of the bottom section 20. Thus, the top and bottom sections 10, 12 in particular are of unequal cross-sectional extent (as measured in planes parallel to the x-z plane) in terms of their lengths along the x axis, and a portion of the top section 10 extending between the plane formed by the right face 20 and the right face 18 constitutes a ledge (or ledge portion/ledge section) 9 of the composite magnetic element 6 insofar as it extends past the bottom section 12. Although in this example, the ledge formed by the top section overhangs the bottom section, in other embodiments it is possible that a ledge of one section would extend outward beneath or to the side of another section.

The size of the composite magnetic element 6 and its component sections 10, 12 can vary depending upon the embodiment and the application. In at least some embodiments, the composite magnetic element 6 can be up to a few hundreds nanometers in length and height. Embodiments of the present invention can include composite magnetic elements that are advantageously thin (e.g., in terms of their height as measured along the y axis of FIG. 1). The sections 10, 12 can be composed of any of a variety of different materials/compositions (including a variety of different materials having different crystalline structures), and can be shaped in a variety of manners (including manners other than that shown in FIG. 1) to achieve particular desired or optimum properties. The sections 10, 12 can be with small or high anisotropies depending upon the embodiment.

In at least some embodiments, the sections 10, 12 have uniaxial anisotropies with direction that can vary from vertical to horizontal and their magnitude can range from large to small values. One of the sections 10, 12 can have a high anisotropy energy relative to the other sections. The high anisotropy can in some embodiments be achieved by forming one or more of the sections 10, 12 from any of a variety of materials including, for example, Iron, Platinum, Cobalt, and Samarium, as well as compounds/alloys of such materials (e.g., Iron and Platinum, Cobalt and Platinum, Samarium and Cobalt), or other metals or alloys (e.g., alloys of metals). The sections 10, 12 can be coupled to one another ferromagnetically through a common interface 11 existing therebetween. This coupling can be non-uniform so that different parts of the common interface 11 can have different ferromagnetic energies, which range from strong to weak. The coupling provided by the common interface 11 is highly influential with respect to the communication of magnetic fields between the sections 10, 12, and thus in particular strongly influences the switching performance of the magnetically hard section 12.

Given the composite magnetic element 6 of FIG. 1 in which the top section 10 is magnetically soft while the bottom section 12 is magnetically hard, the reversal of the magnetization of the element can be achieved with a relatively weak field and with a relatively dense arrangement of elements due to a larger margin for sidewriting (in which an adjacent side track/magnetic element is unintentionally, and typically undesirably, rewritten). The magnetically hard bottom section 12 is particularly useful for effectively, reliably recording data in a thermally stable manner, while the magnetically soft top section 10 is particularly useful for allowing magnetic fields from the read/write head 4 to influence recording on the magnetically hard bottom section even though the magnetic fields may be not very strong. Therefore, given this design of the composite magnetic element 6, desired information can be recorded as a magnetization state in the element and stored for a long enough period of time and in a robust enough manner within a fairly large temperature range (or ranges). The stored information can also then be read and reproduced electronically and/or magnetically.

In addition to these benefits, the composite magnetic element 6 is also particularly useful for addressing how domain walls progress, and for achieving improved field distributions in terms of the permeation of the composite magnetic element 6 by the fields from the head. The chosen elements can be asymmetric, so as to result in strong asymmetry of the reversal field under non-uniform applied fields.

Furthermore, the composite magnetic element 6 is advantageous for facilitating proper recording on particular elements without negatively altering magnetization of neighboring elements. This is particularly true assuming that the magnetic fields produced by the recording head 4 are appropriately varied depending upon whether the head is positioned near one of the left or right edges of the composite magnetic element (or, indeed, between neighboring composite magnetic elements) or positioned between left and right edges. More particularly, to avoid altering the magnetic states of neighboring composite magnetic elements, it is desirable that the particular element can be switched with a weak head field when the head 4 is between the edges of a given composite magnetic element such as the composite magnetic element 6, and that the field required to switch the neighboring elements is strong such that field generated by the head when positioned in this manner is not sufficient to cause reversal in these neighboring elements.

Although the composite magnetic element 6 shown in FIG. 1 has only two sections, it will be understood that in other embodiments composite magnetic elements can be formed that have more than two layered sections. In such embodiments, one or more of the sections can have a high anisotropy energy relative to all of the other sections, or the sections can have anisotropy energies that vary from one another in numerous other manners. Also in such embodiments, the coupling between two or more of the sections can in some cases be anti-ferromagnetic. In terms of operational characteristics, the advantageous characteristics described above with respect to the composite magnetic element 6 are equally true for at least some composite magnetic elements having more than two layered sections, particularly such elements in which a magnetically soft layer is located nearer the exterior of the element than a magnetically hard layer (such that the magnetically soft layer is positioned in between the magnetically hard layer and any read/write head).

Still referring to the example of FIG. 1, both of the sections 10, 12 of the composite magnetic element 6 are characterized by the same damping constant α and saturation magnetization $M_S$. The sections 10, 12 are coupled ferromagnetically with energy per unite area $J_S$. An external magnetic field $H_{ext}$ applied by the read/write head 4 with an angle φ to the vertical axis (that is, the y axis, as shown in FIG. 1) in the x-y plane can be represented as follows:

$$H_{ext} = -H_\alpha(1-2\exp(t/\tau))(\hat{x}\cos\phi + \hat{y}\sin\phi)P)x, x_1, x_2) \quad (1)$$

where $H_\alpha$ is the field magnitude, τ is the field rise time, and P(x, $x_1$, $x_2$) represents the normalized spatial head field distribution. For the purpose of generating the exemplary operational results described below, P(x, $x_1$, $x_2$) is assumed to a pulse function, which is unity for $x_1 < x < x_2$ (where $x_1$ and $x_2$ define the spatial distribution of the field along the x axis of FIG. 1 that is assumed for simulations) and vanishes otherwise. While this specific field is assumed here, in general the head field spatial distribution can have various shapes corresponding to particular head designs. When $H_\alpha$ is higher than a certain reversal field $H_r$ the magnetization reverses its state from the $\hat{y}$ direction to the $-\hat{y}$ direction.

In accordance with these relationships (and depending upon the parameters of the material(s) used in the composite magnetic element 6 and the external field(s) that are applied), magnetic reversal can occur in two distinct mechanisms, namely, damping reversal and precessional reversal. Under damping reversal, the external field must be strong enough to overcome an energy barrier. Under precessional reversal, the system can bypass the energy barrier as long as the energy maximum is below the energy before the external field is applied thus resulting in a reduce reversal field.

Figure 2:
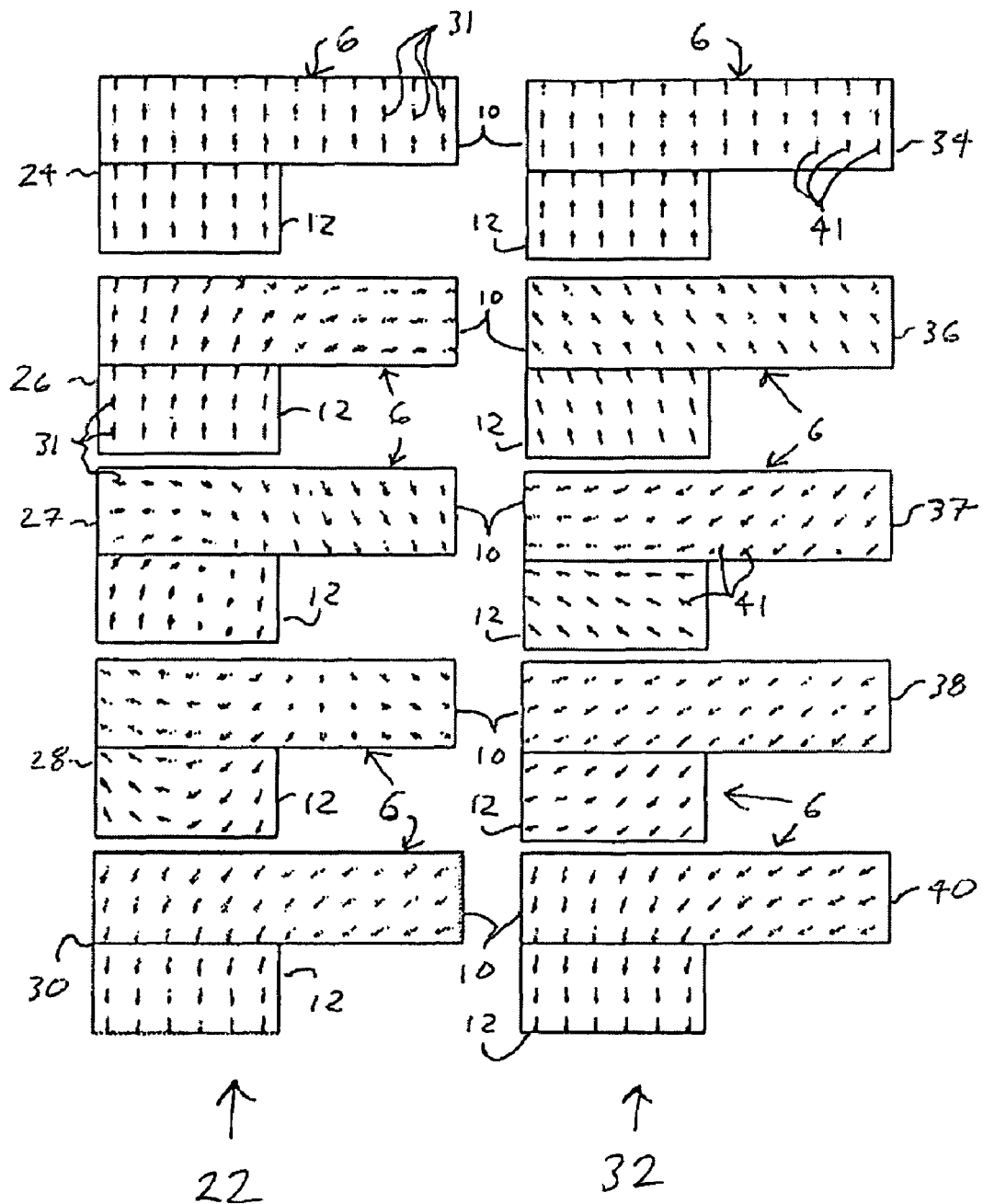
FIGS. 2 illustrates in schematic form how magnetic spins within the composite magnetic element of FIG. 1 experience precessional reversal and damping reversal as the read/write head (when operating in a write mode) moves across the composite magnetic element.

Turning to FIG. 2, first and second sets of schematic diagrams 22 and 24, respectively, are provided that illustrate exemplary spin time evolution within the composite magnetic element 6 of FIG. 1 that can occur if the read/write head 4 moves from beyond the right side of the composite magnetic element, past the right side to the left side and then beyond the left side of the composite magnetic element. More particularly, the first set of schematic diagrams 22 includes first, second, third, fourth and fifth diagrams 24, 26, 27, 28, and 30, respectively, that illustrate an exemplary reversal sequence for magnetic spins 31 (with the orientations of the respective spins being represented by the directions of their respective arrowheads) experiencing a precessional reversal.

In contrast, the second set of schematic diagrams 24 includes first, second, third, fourth and fifth diagrams 34, 36, 37, 38 and 40, respectively, that illustrate an exemplary reversal sequence for magnetic spins 41 undergoing a damping reversal. In both cases, and as illustrated, the magnetic spins 31 within the top section 10 of the composite magnetic element rotate/move earlier (and are influenced more easily) than the spins within the bottom section 12 of the composite magnetic element 6 in response to magnetic fields generated by the read/write head 4 as it moves from left to right across the composite magnetic element. It will be understood that a magnetization reversal mechanism substantially different than that illustrated in FIG. 2 would be experienced in response to movement of the head 4 in the opposite direction, from left to right.

Figure 3:
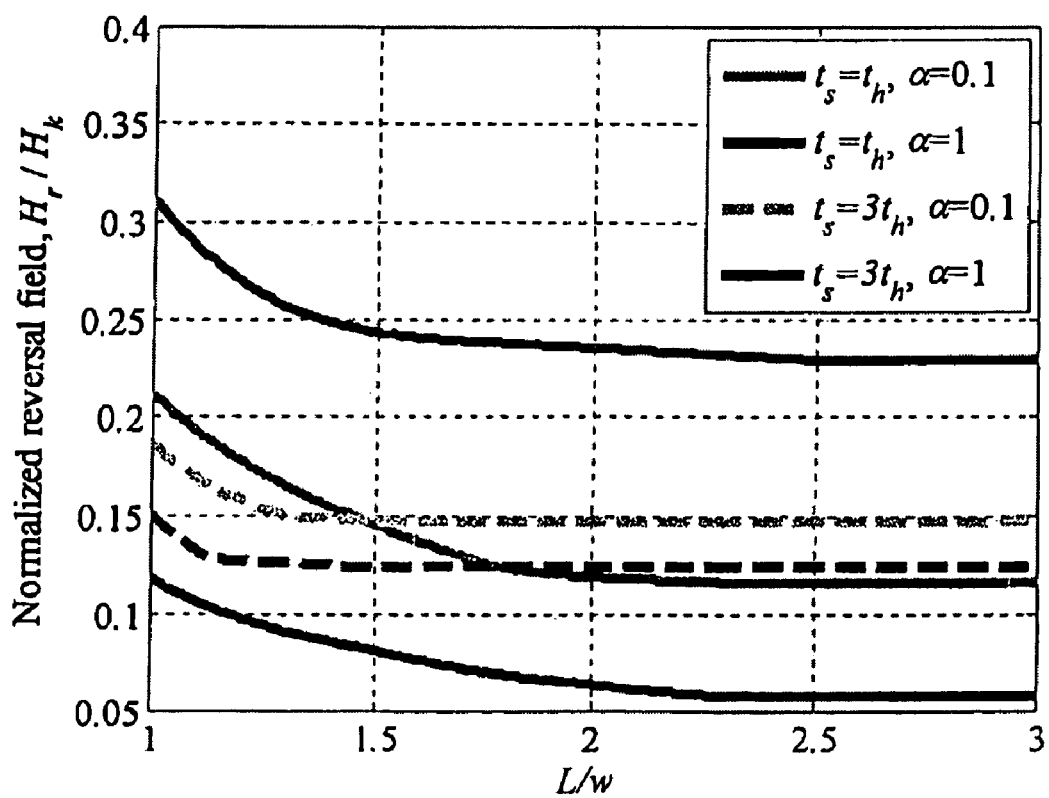
FIGS. 3-7 are graphs showing exemplary normalized reversal field behavior for the composite magnetic element of FIG. 1.

Turning to FIGS. 3-8, several graphs are provided illustrating in more detail exemplary reversal field behavior that can be experienced by a composite magnetic element identical to or similar in structure to the composite magnetic element 6 of FIG. 1, assuming various assumptions are made. These results are merely intended to be illustrative of possible operation of a composite magnetic element identical or similar in structure to the composite element 6 of FIG. 1. All of results shown in FIGS. 3-8 were obtained numerically by studying solutions of the Landau-Lifshitz-Gilbert equation, which take into account the precessional and damping terms with effective magnetic field comprising the Zeeman, anisotropy, exchange, and magnetostatic components. In all examples the anisotropy energy was assumed to be $K_h=3.75 \times 10^6$ erg/cc, the saturation magnetization was assumed to be $M_s=500$ emu/cc, the width of the element (w in FIG. 1) was assumed to be 10 nm, and the thickness of the hard layer ($t_h$) was assumed to be 5 nm. For FIGS. 3-6, the thickness of the soft layer ($t_s$) is assumed to take various values relative to the thickness of the hard layer ($t_h$) as indicated in the particular ones of the FIGS. (e.g., a thickness value equal to that of the hard layer, or three times that of the hard layer, etc.), while for FIG. 7, the thickness of the soft layer ($t_s$) and the hard layer ($t_h$) are each assumed to be equal to w/2 (again, 5 nm). As for the value of L, FIG. 3 is intended to show values corresponding to a variety of values of L as referenced to the value of w (e.g., the graph shows normalized reversal field values as a function of the ratio of L/w), while for each of FIGS. 4-7, L is assumed to be equal to two times the value of w. Assumed values for the angle φ relative to the vertical axis and the damping constant α are also shown.

Additionally an exchange length ($l_{ex}$) as follows $l_{ex}=A^{1/2}/M_s=10$ nm was assumed, where the constant A is the exchange constant and $M_s$ is the saturation magnetization. Additionally, the normalized exchange coupling between the two layers (soft and hard) was chosen as follows $J_S/(2K_h t_h)=0.3$ to lead to low reversal fields in a wide range of the considered parameters; the value of $J_S$ can be further optimized for a particular sets of configurations. These chosen parameters would be suitable for the composite magnetic element 6 were it to be implemented patterned magnetic media suitable for high density recording. Further, the results shown in FIGS. 3-8 pertain to an exemplary embodiment in which external fields are applied instantaneously across the entire composite magnetic element 6 (i.e., in the case where τ=0, $x_1=0$ and $x_2=L$).

Given the above assumptions, FIG. 3 in particular shows the reversal field H, as a function of the soft section length L for different soft section thicknesses $t_s$, damping constants α, and applied field angles φ (that is, FIG. 3 in particular shows exemplary results corresponding to several different versions of the composite magnetic element 6 in terms of the relative thicknesses of the top and bottom sections 10, 12, as well as the damping constants of those sections). As shown, it is found that the reversal field decreases substantially with an increase of L and $t_s$. Compared to homogeneous elements of similar size, the reversal field decrease is more than an order of magnitude. Compared to conventional exchange coupled composite (dual-layer) element of the same size (i.e. for L=w), the reversal field decrease can be more than threefold. The reversal field is found to saturate at large values of L and $t_s$. This saturation is associated with the non-uniform reversal/domain wall for large enough L and $t_s$.

The behavior shown in FIG. 3 resembles that which can occur in at least some conventional composite media. However, for the particular composite magnetic element 6 presented here, the domain wall can occur not only in the vertical dimension (e.g., along the y axis of FIG. 1) but also in the horizontal dimension (e.g., along the x axis of FIG. 1). It results in a significantly larger volume of the soft section before saturation is reached, thus allowing for substantially weaker reversal fields. This reversal field decrease can allow for the use of materials with ultra-high anisotropy, thus solving problems of thermal stability and, at the same time, using conventional write systems. Additionally, FIG. 3 also demonstrates that the reversal field for tilted angles (φ=45°) can be substantially smaller than the reversal fields for normal angles (φ=0). Further, while the reversal field is nearly independent of the damping constant for normal fields (φ=0), for tilted fields (φ=45°), the reversal field significantly decreases with a decrease of the damping constant.

Figure 4:
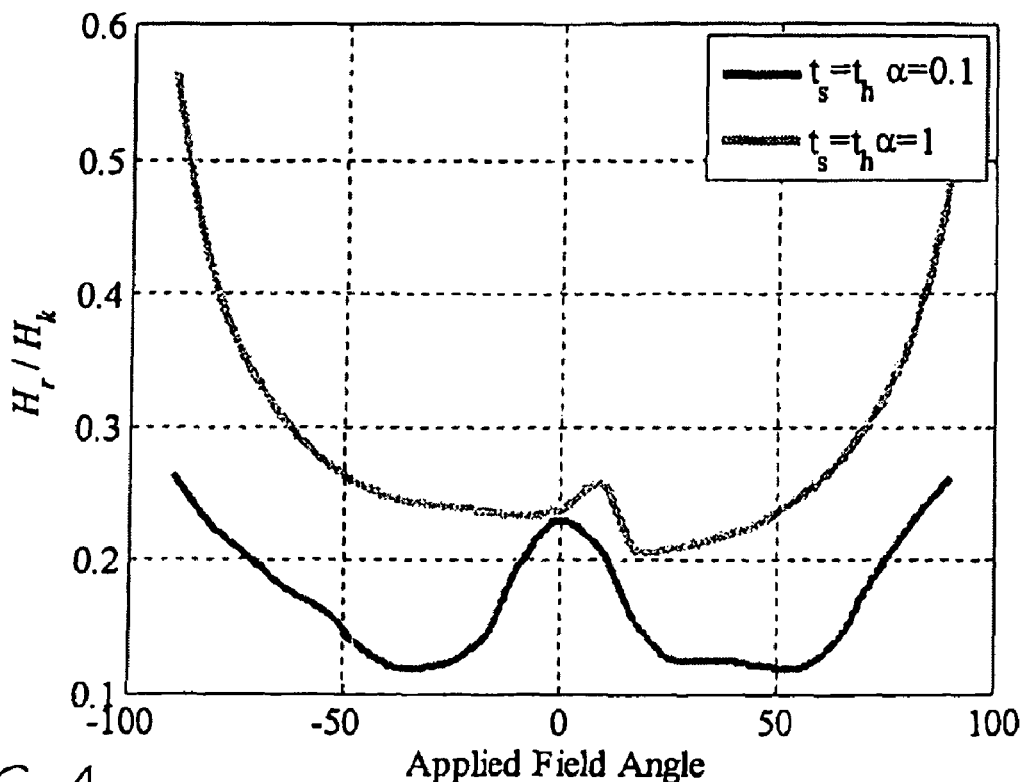

Referring next to FIG. 4, the angular dependence of the reversal field for large and small damping constants is shown. More particularly, it is found that for tilted fields, the reversal field is substantially lower for lower damping constants. As for large damping constants (α=1), $H_r$ increases with an increase of the angle (apart from a small angular region around φ=0). Further, for small damping constants (α=0.1), the reversal field exhibits minima around φ=±45°. The ratio between the reversal fields at $\phi=0$ and $\phi=45°$ is about 2. Additional simulations show that larger soft section thicknesses and lengths can lead to more than threefold reduction of the reversal field. Larger values of the saturation magnetization in the soft section lead even to more significant reduction of the reversal field in the low damping regime under tilted angles. Although this behavior is similar to that found with certain conventional composite media, the reversal field reduction achieved with the composite magnetic element 6 is much more significant. In addition, the angular dependence of the reversal field is asymmetric.

Figure 5:
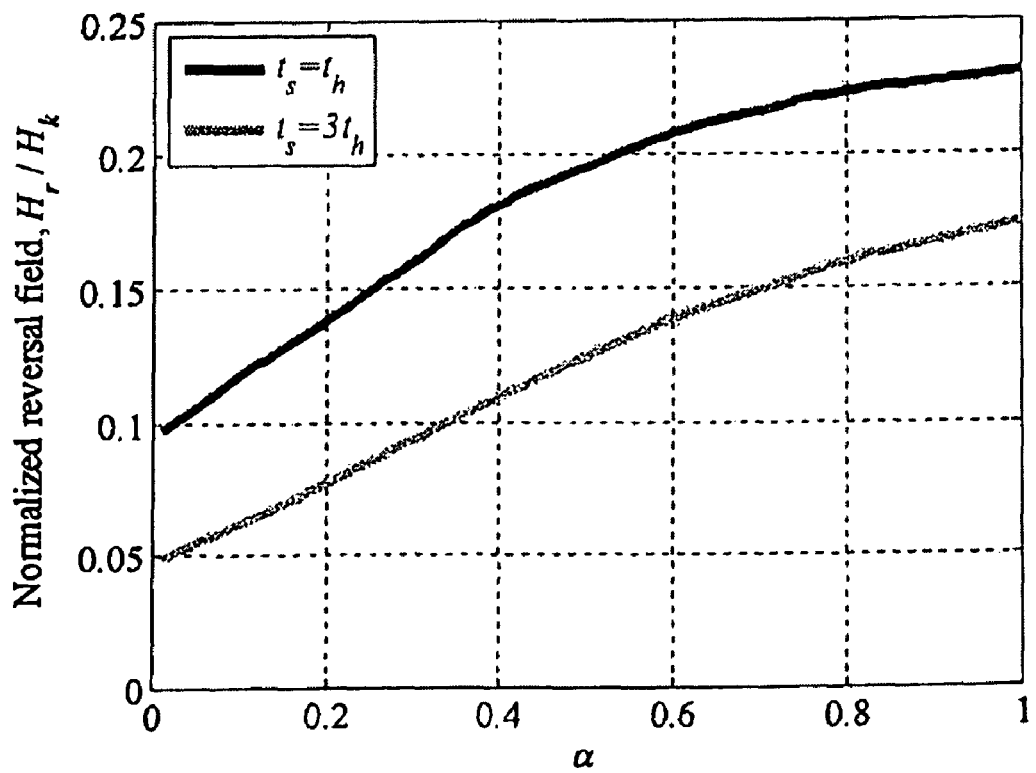

To further characterize the phenomenon of the reversal field reduction, FIG. 5 shows $H_r$ as a function of the damping constant $\alpha$. It is evident that $H_r$ decreases with a decrease of $\alpha$. It is noteworthy that the decrease for smaller $\alpha$ can be more than threefold (see the curve for $t_s=3t_h$). Additional simulations show that the reduction can be even more significant for optimally chosen structure parameters. The phenomena of reduction of $H_r$ with a decrease of a are due in particular to the phenomenon of precessional reversal already discussed above. Precessional reversal in the composite magnetic element 6 of FIG. 1 is characterized by several unique properties (as compared to homogeneous elements and conventional composite element of similar size and material parameters). One such property is the noteworthy decrease of the reversal field. An additional property is related to the maximal critical time still allowing for precessional reversal to occur.

Figure 6:
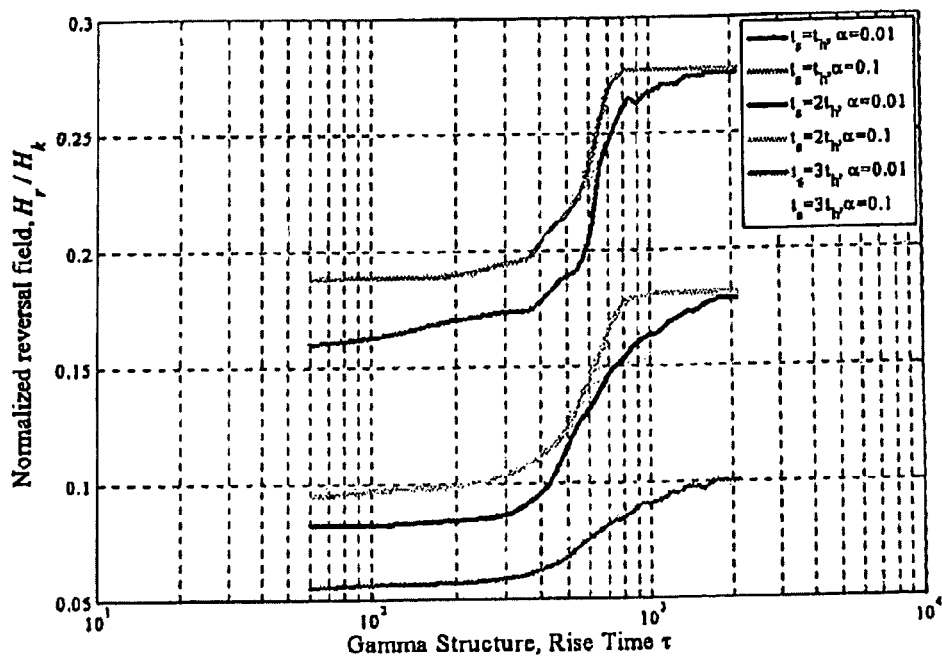

To demonstrate this additional property, FIG. 6 shows the reversal field $H_r$ as a function of the rise time r. It is found that the critical rise time is much larger than that in the case of conventional homogeneous magnetic elements. Further, in comparison with conventional composite elements in which the cross-sectional areas of the different layers of magnetic elements are identical, the critical rise time in the composite magnetic element 6 can be more than 5 times as large. Additionally the critical rise time of the composite magnetic element 6 can be controlled by modifying the exchange coupling between the top and bottom (soft and hard) sections 10, 12. The identified increase of the critical rise time is important as it can allow for the precessional reversal regime with the associated significant reversal field reduction even in the elements with ultra-high anisotropy. It is noted that even with large a there is a noticeable reduction of the reversal for larger L.

Figure 7:
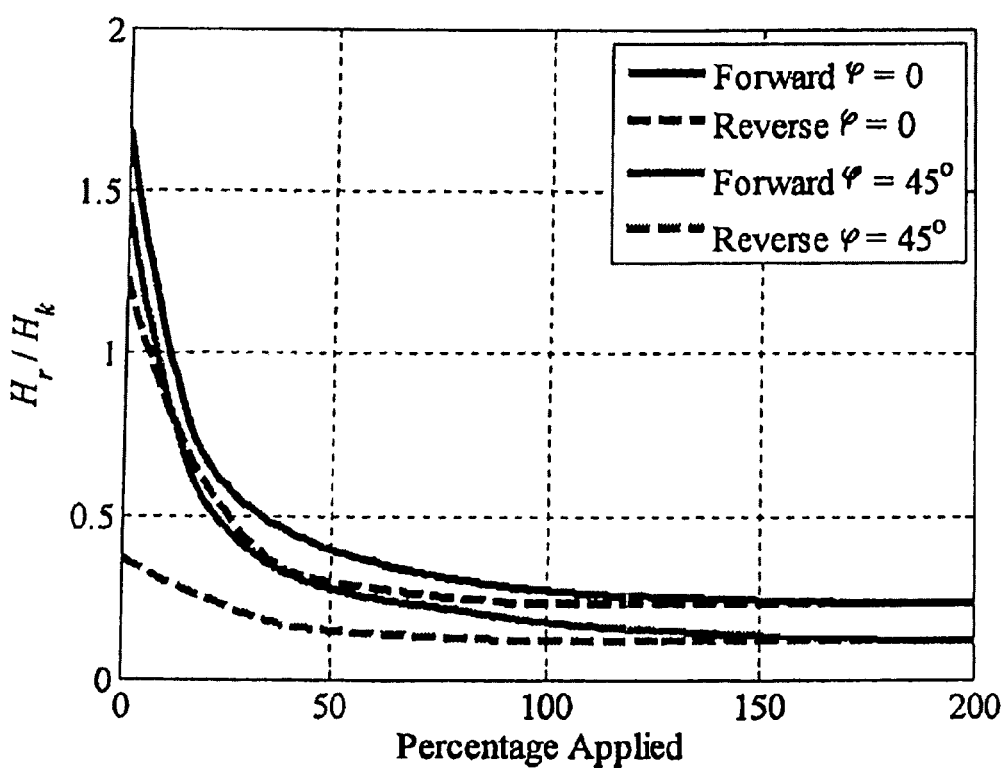

Turning to FIG. 7, reversal fields are shown in the case where the external magnetic field is applied non-uniformly only to a part of the element from its left or right side, i.e. when $x_1 \neq 0$ or/and $x_2 \neq L$. More precisely, we define the percentage of external field coverage with respect to the hard section in two cases as follows. In the "forward" case, $x_1=0$ and the percentage of coverage is defined as $\eta_f=x_2/w$ so that the field covers only a certain part (in the x dimension) of both soft and hard sections from the left edge. In the "backward" case, $x_2=L$ and the percentage of coverage is defined as $\eta_b = (w-x_1)/w$ so that the field covers the entire part of the soft section that does not touch the hard section and a certain part of the hard section from the right hand side. In the y dimension, the field is applied uniformly. These definitions of the non-uniform field coverage are important in a number of realistic situations, e.g. when time margins in the case of a moving recording head are of interest.

Referring still to FIG. 7, the reversal field $H_r$ is shown as a function of $\eta_f$ and $\eta_b$ for the "forward" and "reverse" directions of coverage, respectively, for the damping constant $\alpha=0.1$ and two values of the angle $\phi=0$ (normal external field) and $\phi=45°$ (tilted external field). For both angles the reversal field in the "reverse" case is lower than that in the "forward" case. For the normal external field, the difference between the two cases is particularly pronounced for smaller percentages of coverage. For example, in the "reverse" case, $H_r$ for $\eta_b=0.1$ is only about three times higher than that for $\eta_b=1$. On the other hand in the "forward" case, $H_r$ for $\eta_f=0.1$ is more than nine times higher than that for $\eta_f=1$. The resulting ratio between $H_r$ in the "forward" and "reverse" cases for $\eta_f=\eta_b=0.1$ is more than three. This substantial asymmetry of the reversal field behavior is an important property of the presented asymmetric structures that can help significantly improve time synchronization errors in writing systems.

Figure 8:
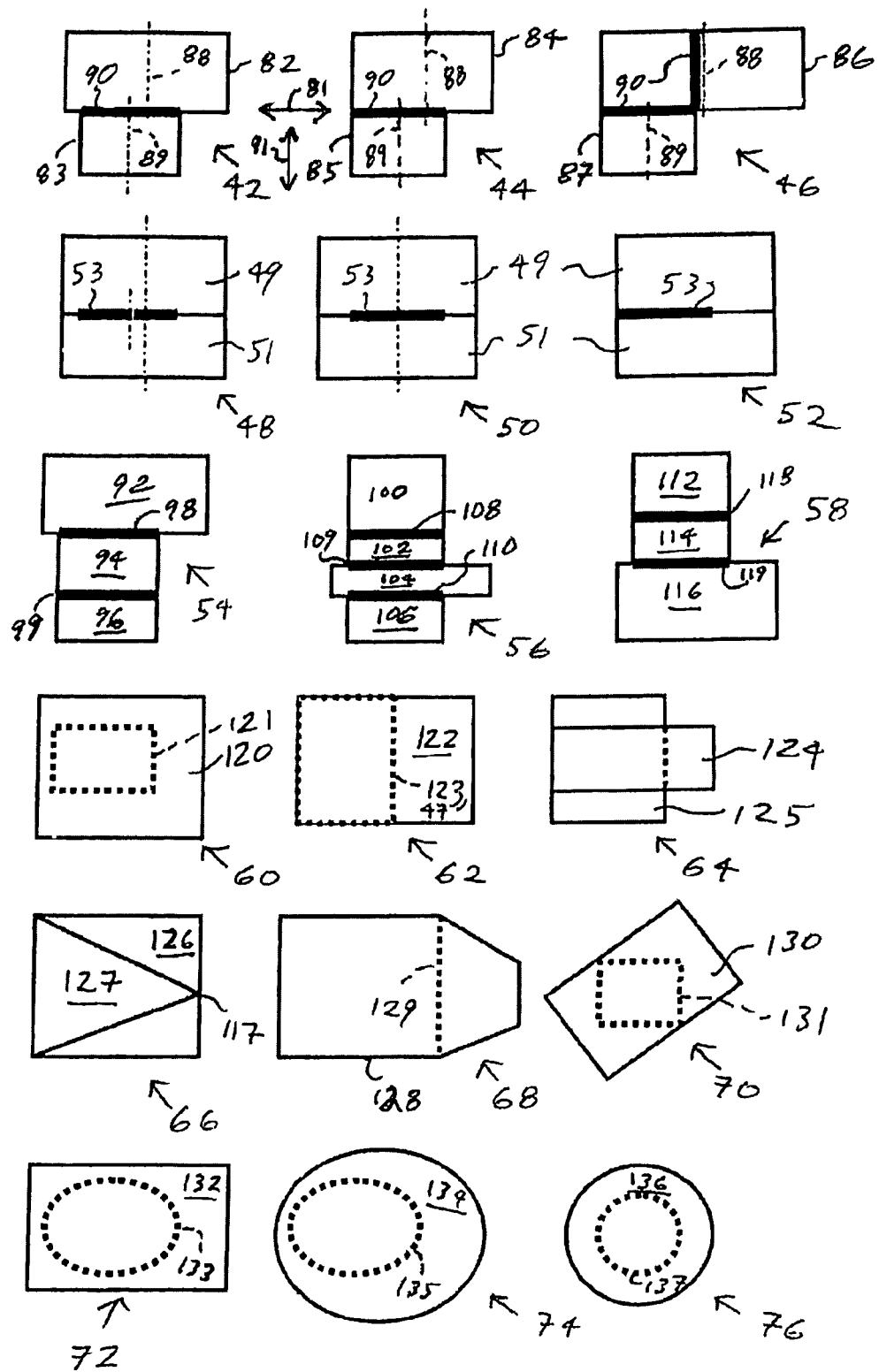
FIG. 8 shows side elevation/top plan views of numerous alternate examples of composite magnetic elements having layers of differing cross-sectional areas in accordance with at least some additional embodiments of the present invention.

Although the composite magnetic element 6 discussed above with respect to FIGS. 1-7 is one exemplary type of composite magnetic element, the present invention is intended to encompass numerous other types of composite magnetic elements having two or more layers of magnetic elements in which at least two of the layers are of different cross-sectional area relative to one another. Turning to FIG. 8, a variety of other exemplary types of composite magnetic elements 42, 44, 46, 48, 50, 52, 54, 56, 58, 60, 62, 64, 66, 68, 70, 72 and 76 encompassed by the present invention are shown, although even the assorted structures illustrated in FIG. 8 are not intended to be exhaustive of all possible composite magnetic elements encompassed by the present invention. It should be noted that, while side elevation views are provided of the composite magnetic elements 42-58, top plan views are provided of the composite magnetic elements 60-76.

More particularly, the composite magnetic elements 42, 44 and 46 are shown to be variations on the composite magnetic elements 6 of FIG. 1, insofar as each of those respective composite magnetic elements has a longer, top section 82, 84 and 86, respectively, and a shorter, bottom section 83, 85 and 87, respectively. The differences between the composite magnetic elements 42, 44, and 46 mainly concern differences in the lengths of the respective top sections 82, 84 and 86 (e.g., the top section 86 is longer than the top section 82 as measured along a length dimension represented by an arrow 81) and the positioning of the top sections relative to their respective bottom sections. In particular, center lines 88 of the top sections 82, 84, 86 are shifted to a relatively lesser or greater degree from center lines 89 of the bottom sections 83, 85, 87 for the different composite magnetic elements 42, 44 and 46.

The lengths of the top sections 82, 84, 86 (again, as measured along the length dimension represented by the arrow 81) can be set based upon various considerations including, among other things, the desired spacing between the composite magnetic elements of the patterned media in which those elements are employed. Additionally, both the heights/thicknesses (as measured along a height dimension represented by an arrow 91, which is perpendicular to the length dimension represented by the arrow 81) of the various sections 82-87, as well as the widths (as measured along a width dimension that would be perpendicular to each of the arrows 81, 91) of the various sections, can vary depending upon the embodiment. In particular, the height/thickness of the top section of any given composite magnetic element need not be the same as that of the bottom section of that element and, likewise, the width of any given composite magnetic element need not be the same as that of the bottom section of that element.

Also, it can be noted that the composite magnetic element 42 in particular has top and bottom sections 82 and 83 that are configured so that the top section extends past the bottom section on both ends, while the composite magnetic elements 44 and 46 have top sections 84, 86 that only extend past their respective bottom sections 85, 87 at one of the ends (in this regard the composite magnetic elements 44, 46 are similar to the composite magnetic element 6 of FIG. 1). In particular with respect to the composite magnetic element 42, it will be noted that the top section 82 extends past the bottom section 83 more on the right side than on the left, such that a right "ledge" of that composite magnetic element is larger than its left "ledge" (although in other embodiments the left ledge could be larger, or the two ledges could be equal in extent).

Further as shown, a respective common interface 90 between the respective top sections 82, 84, 86 and respective bottom sections 83, 85, 87 of each of the composite magnetic elements 42, 44 and 46 is shown, by which those top and bottom sections are ferromagnetically coupled. In the case of the top section 86, an additional common interface 90 is also shown that extends through that top section (that is, in addition to the common interface positioned between that top section and the bottom section 87), by which ferromagnetic coupling occurs between two adjacent portions of the top section that are physically distinct, such that those two adjacent portions effectively behave as a single top section. Thus, the top section 86 is indicative of the possibility that, in at least some circumstances, a given section or layer of a composite magnetic element can be made up of distinct segments that nonetheless operate together as a single section (so long as appropriate ferromagnetic coupling is present).

As for the composite magnetic elements 48, 50 and 52, each of these represent exemplary composite magnetic elements that are intended to be encompassed within the present invention even though each of those elements has top and bottom sections 49 and 51, respectively, that are of equal cross-sectional extent rather than differing cross-sectional extent. Notwithstanding this configuration, these composite magnetic elements 48, 50, 52 are capable of experiencing operation similar to that experienced by the composite magnetic element 6 of FIG. 1 (and other composite magnetic elements having layers of differing cross-sectional extent and thereby having one or more ledges as discussed above) because, in each of these composite magnetic elements, a respective common interface 53 within the respective composite magnetic element only extends along a respective portion of a respective junction between the respective top and bottom sections 49, 51 of the respective composite magnetic element. Consequently, ferromagnetic coupling between the respective top and bottom sections 49, 51 of each respective composite magnetic element 48, 50 and 52 is limited to only that region at which occurs the respective common interface. Further as shown, depending upon the embodiment, the common interfaces 53 can be positioned in different manners. In this regard, the common interface 53 of the element 48 is slightly off-center relative to central axes of the top and bottom sections 49, 51 of that element, while the common interface of the element 50 is centrally positioned relative to the central axes of that element and the common interface of the element 52 is positioned as far as possible to one side of that element.

Further, with respect to the composite magnetic elements 54, 56 and 58, each of these is a composite magnetic element having more than two layers of elements that together form the overall composite magnetic element. More particularly as shown, the composite magnetic element 54 has a top section 92, a middle section 94 and a bottom section 96, where the top section is of greater length than either of the middle and bottom sections (which are of equal length), and where first and second common interfaces 98 and 99 are respectively positioned between the top and middle and middle and bottom sections, respectively.

By comparison, the composite magnetic element 56 has four sections, namely, a top section 100, a first middle section 102 beneath the top section, a second middle section 104 beneath the first middle section, and a bottom section 106, with common interfaces 108, 109 and 110 being positioned along the junctions between the respective pairs of adjacent sections 100 and 102, 102 and 104, and 104 and 106, respectively. In this exemplary embodiment, the top section 100, first middle section 102 and bottom section 106 all are of equal length, while the second middle section 104 is of greater length than the other sections such that ledges are formed by the second middle section. In alternate embodiments, the sections 100, 102, 104 and 106 can be of other lengths than those shown and the second middle section 104 need not be the longest section or the only section having a length greater than those of one or more other sections.

Further, with respect to the composite magnetic element 58, that element is an inverted version of the composite magnetic element 54 insofar as it includes a top, middle and bottom sections 112, 114 and 116, respectively, where the top and middle sections 112, 114 are separated by a common interface 118 and the middle and bottom sections 114, 116 are separated by a common interface 119, but where the top and middle sections are of equal length but the bottom section has a greater length than the other two sections.

Additionally, with respect to the composite magnetic elements 60-76, a top plan view of each of these elements is provided (with the exception of the view provided concerning the element 66, which is a bottom plan view), so as to reveal both top sections and bottom sections (sometimes shown partly or entirely in phantom) of these elements. As shown, the composite magnetic element 60 has top and bottom sections 120 and 121, respectively, that are both rectangular, where the top section is of greater extent than the bottom section both in terms of width and length and the bottom section is positioned inwardly of all of the side edges of the top section such that a ledge formed between the top and bottom sections extends all of the way around the bottom section. Similarly, the composite magnetic element 70 has top and bottom sections 130 and 131, respectively, which are both rectangular, and where both of the length and width dimension of the bottom section 131 are less than the length and width dimensions of the top section 130. In this embodiment, however, the rectangular bottom section 131 is rotated relative to the rectangular top section 130, such that two corners of the rectangular bottom section fall directly beneath two corresponding sides of the top section.

As for the composite magnetic element 62, it also has a top section 122 and a bottom section 123 that are both rectangular, in that exemplary element the bottom section has a width that is identical to that of the width of the top section and is further positioned to one end of the length of the top section. Consequently, one of the end edges of the top section 122 is aligned with one of the end edges of the bottom section 123 in the composite magnetic element 62. Additionally as a result, in the composite magnetic element 62, the top section 122 only forms a ledge extending off of an end edge 47 of the bottom section. The composite magnetic element 62 in general has similar characteristics to each of the composite elements 6, 44 and 46 described above. As for the composite magnetic element 64, that element is similar to the composite magnetic element 62 except insofar as top section 124 of that magnetic element has a lesser width than a bottom section 125 of that magnetic element. Consequently, the composite magnetic element 64 includes additional ledges where the bottom section 125 extends outward past the side edges of the top section 124.

As for the composite magnetic element 66, this element includes a triangular bottom section 127 that is positioned beneath a rectangular top section 126. In the present example, one of the side edges of the triangular bottom section 127 is aligned with one of the end edges of the rectangular top section 126, and extends the entire width of the bottom section. Consequently, ledges are only formed by the top section 126 relative to the bottom section 127 as one proceeds away from the aligned edges toward a tip 117 of the bottom section (which in the present embodiment is aligned with the other end edge of the rectangular top section. Further with respect to the composite magnetic element 68, in this example a bottom section 129 is trapezoidal while a top section 128 is a hexagon formed by the combination of a trapezoidal portion that is coextensive with the bottom section and a rectangular portion that extends off of the based of the trapezoidal portion.

Finally, with respect to the composite elements 72, 74 and 76, these elements each have a respective top section 132, 134, and 136, respectively, and a respective bottom section 133, 135, and 137, respectively. The top sections 132, 134 and 136 respectively are rectangular, oval/elliptical and circular in shape, while the bottom sections 133 and 135 are both oval in shape and the bottom section 137 is circular in shape. In each case, the respective bottom section is lesser in cross-sectional extent both lengthwise and widthwise than the respective top section, such that at a respective ledge is formed by each respective top section that extends entirely around the respective bottom section.

Figure 9:
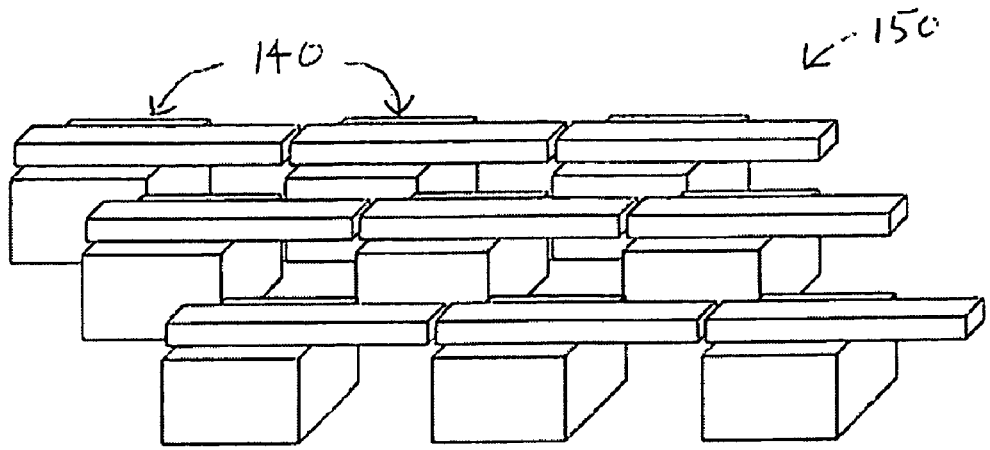
FIG. 9 shows a side perspective view of an array of composite magnetic elements similar to that of FIG. 1, which together form at least a portion of a patterned magnetic media in at accordance with at least one additional embodiment of the present invention.

Turning to FIG. 9, as already mentioned, the composite magnetic elements described herein are intended in most (if not necessarily all) circumstances as being implemented in an array of such elements so as to form a patterned magnetic media. When so implemented, the composite magnetic elements of such media can be physically connected together and/or disconnected from one another, depending upon the embodiment. Further, depending upon the embodiment, the composite magnetic elements of such media can be magnetically coupled with one another or uncoupled from one another. FIG. 9 in particular illustrates nine composite magnetic elements 140 arranged in a two-dimensional array 150.

More particularly, it should be noted that the various composite magnetic elements of a patterned magnetic media depending upon the embodiment not only can be disconnected from one another but also can be physically connected with one another, in a manner that does or does not involve ferromagnetic coupling. In one exemplary case, the soft parts of the elements (e.g., the portions of the elements corresponding to the top section 10 of the composite magnetic element 6 of FIG. 1) in the patterned magnetic medium are continuously connected from element to element effectively forming a continuous soft layer (while the hard parts of the elements are not so connected). Also, in some alternate embodiments it is possible that material properties in one or more of the parts (e.g., soft or hard) of a given composite magnetic element can vary gradually, experience a gradient, or otherwise be inhomogeneous.

The composite magnetic elements 140 as shown are most similar to the composite magnetic element 64 shown in FIG. 8, albeit any of the various composite magnetic elements 6 and 42-76 discussed above (and numerous other types of composite magnetic elements differing from those discussed above) can be implemented in such a patterned magnetic media array as well. In alternate embodiments, the array can be of any arbitrary size and dimensions and involve any arbitrary number of composite magnetic elements. In further alternate embodiments, the array can include both one or more composite magnetic elements that involve layers of different cross-sectional extents such as the composite magnetic elements 6, in combination with one or more conventional composite magnetic elements (or even conventional homogenous magnetic elements).

Additionally, it should be understood that the various variables and parameters and assumed values for such parameters as set forth above are merely intended to be exemplary and are not intended to be limit the scope of the present invention. For example, while in at least one embodiment described above the thickness of the hard layer ($t_h$) (the thickness of the layer as measured along a dimension perpendicular to the junction between the hard and soft layers) is set at 5 nm, in other embodiments this thickness can take on other values, for example, values from approximately 3 nm to approximately 50 nm.

Embodiments of the present invention can be used in a variety of applications and for a variety of purposes. Among other things, embodiments of the present invention are particularly suited for use in high density hard disk drives (especially when implemented as arrays such as that shown in FIG. 9). Use of patterned magnetic media employing composite magnetic elements in accordance with embodiments of the present invention can be achieved using recording (e.g., reading/writing) methods are otherwise not significantly different from those employed with current drives; however, it is possible that, by properly selecting the direction of the read/write head and the writing direction (that is, the direction in which the head moves), significant additional advantages can be achieved, including reduction of the reversal fields and reduced misregistration errors.

Also, embodiments of the present invention are particularly applicable for use in Magnetic Random Access Memory (MRAM) devices. The above-mentioned features are beneficial for fast and reliable recording. Although MRAMs usually do not have a moving head, the asymmetric behavior to the writer position is advantageous in designs for high density element configurations. Notwithstanding the above discussion, embodiments of the present invention are not limited to any particular application/purpose, but rather can be used in a variety of applications/purposes. Further, it should be noted that embodiments of the present invention, and particularly composite magnetic elements and patterned media employing such composite magnetic elements, can be fabricated by current nanolithography techniques (or extensions thereof).

In short, the present invention is intended to encompass a wide variety of composite magnetic elements having two or more layers of magnetic elements having different cross-sectional extent (as a result of which one or more ledges are formed), as well as a variety of different types of patterned magnetic media employing such magnetic elements and systems/applications/purposes making use of such structures. Use of composite magnetic elements in accordance with embodiments of the present invention results in several advantageous features relative to conventional magnetic elements. As already discussed, the composite magnetic elements allow for a reduction of the reversal fields relative to conventional composite elements.

In particular, the proposed structures allow significantly reducing the switching field (e.g., the minimal magnetic field produced by a write system that is required to reverse the state of magnetization of a given magnetic element). The reduction can be much more significant than in the case of simple homogeneous elements or in the case of exchange coupled composite elements comprising multiple layers of hard and soft materials with identical horizontal cross-sections. Indeed, it has been shown that the reversal field using composite magnetic elements in accordance with the present invention can be more than three times lower than when using conventional composite magnetic elements. As compared to a homogeneous element with similar dimensions the switching field reduction is more that an order of magnitude. The low reversal field allows switching elements having ultra-high anisotropy using heads designed using (extensions of) conventional technologies. Elements with ultra-high anisotropies translate to ultra-high thermal stability, a desirable characteristic for magnetic media. More particularly, by comparison with a conventional homogeneous magnetic elements, the reversal field for a composite magnetic element in accordance with at least some embodiments of the present invention (such as that discussed above with respect to FIG. 1) can be up to 10 times lower than can be attained using a conventional homogeneous magnetic element having the same thermal stability. Also, it should be noted that the critical rise time for precessional reversal up using a composite magnetic element in accordance with at least some embodiments of the present invention can be up to 100 times larger than for a homogeneous magnetic element of the same thermal stability.

Additionally, composite magnetic elements in accordance with embodiments of the present invention can have a small size in the vertical dimension keeping a large effective volume because the soft layer sections of the elements do not have to be increased and, instead, they can be larger in the plane. This allows a smaller gap between the read/write head and the soft underlayer achieving strong head fields. This is in contrast with conventional composite media, which in order to result in a noticeable reduction of the reversal field are required to have a thick soft layer. More particularly, the height/thickness of one or more of the layers of a composite magnetic element in accordance with at least some embodiments of the present invention can be up to three times smaller than that of the layer(s) of conventional composite material element having the same reversal field and thermal stability. In at least some cases, the reversal field achieved using embodiments of the present invention has an asymmetric behavior for non-uniformly applied fields (which can help for misregistration errors).

Further, the use of composite magnetic elements in accordance with embodiments of the present invention allow for an improvement of the time margins for down-track and off-track. In particular, by introducing an asymmetry in the proposed structures results in a strong asymmetry in the reversal fields under non-uniform applied fields. Under non-uniform applied fields, the proposed structures are characterized by reversal fields which are much lower in a certain preferable direction. This direction can be chosen to allow recording with low reversal fields. The higher reversal fields in all other directions reduce the probability of overriding the element when down-track or off-track timing errors occur. This asymmetric reversal field behavior is a unique property of the proposed structures.

The improvements in the reversal fields achieved through the use of composite magnetic elements in accordance with embodiments of the present invention, relative to the reversal fields achieved using conventional magnetic elements, can be further described as follows. Consider a bit patterned medium (BPM) that comprises an array of ledge elements as in FIG. 9. The information is recorded using a magnetic head placed near the BPM. The recording methods are not significantly different from the current drives. However, by properly selecting the elements properties of the BPM element/array composition and recording head parameters important advantages are obtained as compared to BPM employing conventional magnetic elements.

More particularly, the performance of such an exemplary BPM as shown in FIG. 9 can be seen to be superior to that of a BPM employing an array of homogeneous magnetic elements as follows. For homogeneous elements with the anisotropy field $H_K$, the reversal field is $H_r = H_K$ for the head field preferably in the normal direction and $H_r = H_K/2$ for the field under 45° with respect to the anisotropy axis. For large density materials, which require high thermal stability and thus large $H_K$, it translates into very strong reversal fields that are hard to generate in practical recording fields. On the other hand, the exemplary BPM of FIG. 9 can have the reversal field as low as $H_K/10$. This is achieved without sacrificing the thermal stability, which is determined by the hard section of the elements. These properties allow using materials with a large anisotropy and thermal stability, which is vital for ultra-high density recording.

Further, the performance of such an exemplary BPM as shown in FIG. 9 can be seen to be superior to that of a BPM employing an array of conventional composite magnetic elements as follows. Conventional composite elements typically comprise two (or more) coupled hard and soft layers that are equal in their respective cross-sectional areas. The reduction of the reversal field due to the presence of the soft section is pronounced only when the soft section is large enough such that a domain wall can fit in the vertical direction, thus resulting in a large vertical size of the elements. The head field typically reduces rapidly in the vertical direction away from the head. As a result, the head field reduces, thus effectively leading to an increase of the required reversal field.

By comparison, the composite magnetic elements having ledges employed in the exemplary BPM of FIG. 9 allow for reduction in vertical size and reversal field thus, allowing for materials with larger $H_K$, larger thermal stability, and larger density. Further, these media can significantly reduce the down-track or off-track timing errors, which occur due to statistical distributions of the element properties (e.g. distributions of the anisotropy field). The errors occur when the head field is too weak and cannot switch an element being recorded or too strong to switch the (previously recorded) elements next to the element being recorded. Such errors set an upper limit on the distance between the elements and hence the recording density reduction. For thin (ledge) elements such errors can particularly be significantly reduced.

Moreover, the ledge elements can have strongly asymmetric properties such that the reversal field is much stronger when the head covers the entire element than when it covers only a small part of the element. In particular, this property can be achieved under precessional reversal. It can be shown that for a given head field rise time, reversal can occur in the precessional regime with the associated reduced reversal field for a fully covered (by the head) elements. For a partially covered element, the reversal occurs in the damping regime with a stronger reversal field. This property again contributes to the reduction of the down-track or off-track timing errors. Still an additional potential advantage of the reduced vertical size is that it can improve the read-play signal (from a reading head).

It is specifically intended that the present invention not be limited to the embodiments and illustrations contained herein, but include modified forms of those embodiments including portions of the embodiments and combinations of elements of different embodiments as come within the scope of the following claims. It should further be understood that, while directional terms (e.g., top, bottom, left, right, etc.) have been used above to facilitate discussion of the relative orientations of portions of embodiments of the present invention, the use of these directional terms should not be understood as an indication that any portions of the present invention need to have any particular orientation relative to ground or any other reference point; rather, these terms have been merely used for convenience in describing exemplary embodiments of the present invention.

We claim:

1. An apparatus for magnetic recording, the apparatus comprising:
   a first portion of a first magnetic medium having a first cross-sectional area; and
   a second portion of a second magnetic medium having a second cross-sectional area, wherein the first and second portions are joined by way of a junction that allows for ferromagnetic coupling between the first portion and the second portion and to thereby form a first composite magnetic element, wherein the first and second cross-sectional areas are of differing extent in a first dimension so that a first ledge portion of one of the first and second portions extends past a first edge of the other of the first and second portions, wherein the first ledge portion allows for at most a weak ferromagnetic coupling between the first composite magnetic element and at least one neighboring composite magnetic element that is insufficient to alter magnetization state of the at least one neighboring composite magnetic element while magnetization state of the first composite magnetic element is being altered, and wherein the first magnetic medium is a magnetically soft medium, and wherein the second magnetic medium is a magnetically hard medium.

2. The apparatus of claim 1, wherein when the first magnetic medium is exposed to a magnetic field, the magnetic field causes a magnetization reversal in the soft medium that assists in causing a magnetization reversal in the hard medium.

3. The apparatus of claim 2, wherein one of the first and second portions has a substantially higher anisotropy than the other of the first and second portions.

4. The apparatus of claim 1, wherein the first magnetic medium has a thickness as measured along a dimension perpendicular to the junction of approximately 3 to 50 nm.

5. The apparatus of claim 1 wherein a reversal field of the apparatus has an asymmetric behavior for non-uniformly applied fields.

6. The apparatus of claim 1, wherein the first and second cross-sectional areas differ in extent in a length dimension that extends parallel to the junction.

7. The apparatus of claim 6, wherein the first and second cross-sectional areas differ in extent additionally in a width dimension that extends parallel to the junction and perpendicular to the length dimension.

8. The apparatus of claim 7, wherein the first magnetic medium and the second magnetic medium have different thicknesses, respectively, as measured along a thickness dimension perpendicular to the length dimension and the width dimension.

9. The apparatus of claim 1, wherein the first magnetic medium has a rectangular cross-section.

10. The apparatus of claim 9, wherein the second magnetic medium has at least one of a rectangular cross-section, a triangular cross-section, an elliptical cross-section and a circular cross-section.

11. The apparatus of claim 1, wherein the first and second cross-sectional areas are of differing extent in both the first dimension and a second dimension, and wherein a second ledge portion of one of the first and second portions extends past a second edge of the other of the first and second portions.

12. The apparatus of claim 1, wherein a second ledge portion of the one of the first and second portions extends past a second edge of the other of the first and second portions.

13. The apparatus of claim 1, further comprising at least one additional portion of at least one of the first magnetic medium, the second magnetic medium and a third magnetic medium, wherein the first, second and at least one additional portions are stacked such that the second portion is positioned between the first portion and the at least one additional portion.

14. The apparatus of claim 1, wherein at least one of the first magnetic medium and the second magnetic medium is made from a material selected from the group consisting of Iron, Platinum, Cobalt, Samarium, a compound/alloy of Iron and Platinum, a compound/alloy of Cobalt and Platinum, a compound/alloy of Samarium and Cobalt, an other metal, and an other alloy.

15. A patterned magnetic media array comprising the apparatus of claim 1 and a plurality of additional composite magnetic elements each having the same structure as the first composite magnetic element.

16. A system for magnetic recording comprising:
a recording head capable of generating magnetic fields;
a patterned magnetic media including a plurality of composite magnetic elements, wherein at least a first composite magnetic element of the plurality of the composite magnetic elements includes
a first portion of a first magnetic medium having a first cross-sectional area; and
a second portion of a second magnetic medium having a second cross-sectional area,
wherein the first and second portions are joined by way of a junction that allows for ferromagnetic coupling between the first portion and the second portion,
wherein the first and second cross-sectional areas are of differing extent in a first dimension so that a first ledge portion of one of the first and second portions extends past a first edge of the other of the first and second portions, and
wherein the first ledge portion allows for at most a weak ferromagnetic coupling between the first composite magnetic element and at least one neighboring composite magnetic element that is insufficient to alter magnetization state of the at least one neighboring composite magnetic element while magnetization state of the first composite magnetic element is being altered.

17. A method of magnetic recording comprising:
providing a patterned magnetic media including a plurality of composite magnetic elements, wherein at least a first composite magnetic element of the plurality of the composite magnetic elements includes
a first portion of a first magnetic medium having a first cross-sectional area; and
a second portion of a second magnetic medium having a second cross-sectional area,
wherein the first and second portions are joined by way of a junction that allows for at least some ferromagnetic coupling between the first portion and the second portion,
wherein the first and second cross-sectional areas are of differing extent in a first dimension so that a first ledge portion of one of the first and second portions extends past a first edge of the other of the first and second portions, and
wherein the first ledge portion allows for at most a weak ferromagnetic coupling between the first composite magnetic element and at least one neighboring composite magnetic element that is insufficient to alter magnetization state of the at least one neighboring composite magnetic element while magnetization state of the first composite magnetic element is being altered; and
controlling movement of a recording head across the patterned magnetic media and simultaneously controlling a magnetic field generated by the recording head so as to influence collective magnetization levels experienced by the composite magnetic elements,
whereby information is stored on the patterned magnetic media.

* * * * *